United States Patent
Cho

(10) Patent No.: US 9,965,692 B2
(45) Date of Patent: May 8, 2018

(54) SYSTEM AND METHOD FOR DETECTING VEHICLE

(71) Applicant: MANDO CORPORATION, Gyeonggi-do (KR)

(72) Inventor: Young Ha Cho, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 52 days.

(21) Appl. No.: 15/008,413

(22) Filed: Jan. 27, 2016

(65) Prior Publication Data
US 2016/0217334 A1    Jul. 28, 2016

(30) Foreign Application Priority Data

Jan. 28, 2015   (KR) ......................... 10-2015-0013314

(51) Int. Cl.
*G06K 9/00*      (2006.01)
*G06K 9/62*      (2006.01)
(Continued)

(52) U.S. Cl.
CPC ....... *G06K 9/00805* (2013.01); *G06K 9/2054* (2013.01); *G06K 9/6257* (2013.01);
(Continued)

(58) Field of Classification Search
CPC ............. G06T 7/73; G06T 2207/30261; G06T 2207/30236; G06T 2207/30252;
(Continued)

(56) References Cited

U.S. PATENT DOCUMENTS

| 2004/0054473 A1* | 3/2004 | Shimomura | G01S 3/7865 701/301 |
| 2004/0234136 A1* | 11/2004 | Zhu | G06K 9/3241 382/224 |
| 2006/0140449 A1* | 6/2006 | Otsuka | G06K 9/3241 382/104 |

FOREIGN PATENT DOCUMENTS

JP    2001-134771     5/2001
KR    20120062137 A  *  6/2012
(Continued)

OTHER PUBLICATIONS

Boumediene et al. "Vehicle Detection Algorithm Based on Horizontal/Vertical Edges." 7th International Workshop on Systems, Signal Processing and Their Applications, May 9, 2011, pp. 396-399.*

(Continued)

*Primary Examiner* — Jon Chang
(74) *Attorney, Agent, or Firm* — Ladas & Parry, LLP

(57) ABSTRACT

The invention relates to a vehicle detection method which includes: photographing a front-view of a vehicle; detecting an edge from an image photographed by a camera and generating a horizontal binary image and a vertical binary image; detecting a bottom surface candidate group relating to a preceding vehicle from the horizontal binary image and detecting a side surface candidate group relating to the preceding vehicle from the vertical binary image; when one of a pair of side surface candidate groups and bottom surface candidate groups of the pair of side surface candidate groups is not detected, estimating the side surface candidate group and bottom surface candidate group and generating a vehicle candidate group; and filtering the vehicle candidate group and detecting the preceding vehicle. Therefore, even when all of vehicles are not perfectly photographed, a preceding vehicle can be more precisely detected.

7 Claims, 11 Drawing Sheets

(51) Int. Cl.
*G06T 7/00* (2017.01)
*G06K 9/20* (2006.01)
*G06T 7/73* (2017.01)

(52) U.S. Cl.
CPC ...... *G06T 7/73* (2017.01); *G06T 2207/30236* (2013.01); *G06T 2207/30261* (2013.01)

(58) Field of Classification Search
CPC ............ G06K 9/00805; G06K 9/6257; G06K 9/2054; G06K 9/00825
See application file for complete search history.

(56) References Cited

FOREIGN PATENT DOCUMENTS

| | | |
|---|---|---|
| KR | 10-2013-0000023 | 1/2013 |
| KR | 10-1263158 | 5/2013 |

OTHER PUBLICATIONS

Song et al. "Vehicle Detection by Edge-Based Candidate Generation and Appearance-based Classification." IEEE Intelligent Vehicles Symposium, Jun. 4, 2008, pp. 428-433.*
Engish Translation of KR10-2012-0062137.*
Office Action dated Jan. 19, 2016 for Korean Patent Application No. 10-2015-0013314.

* cited by examiner

FIG.3
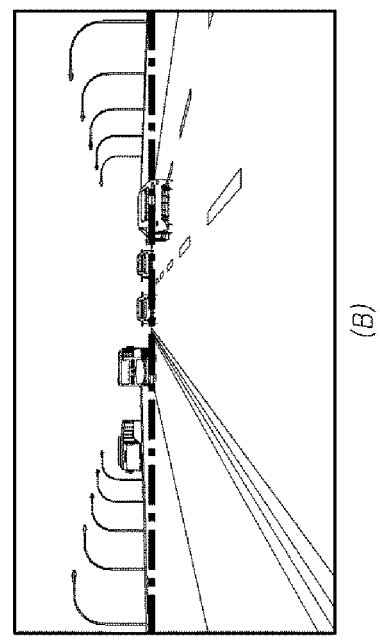
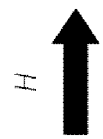
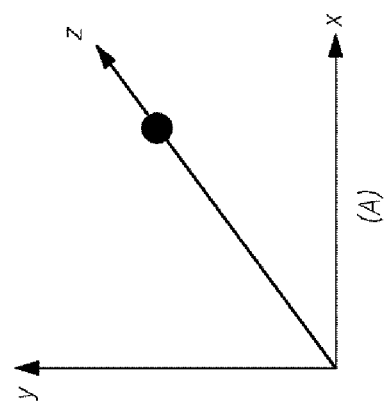

FIG.5
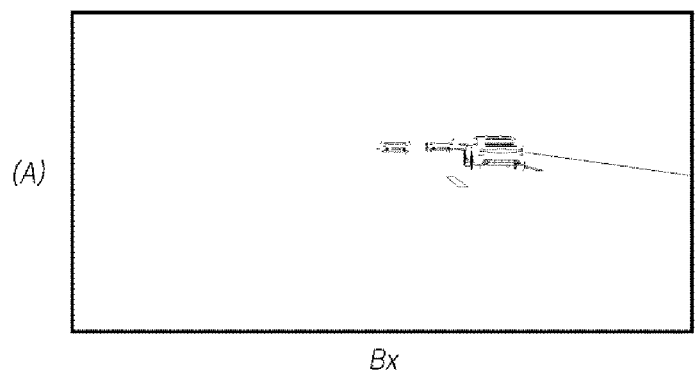
(A)
Bx
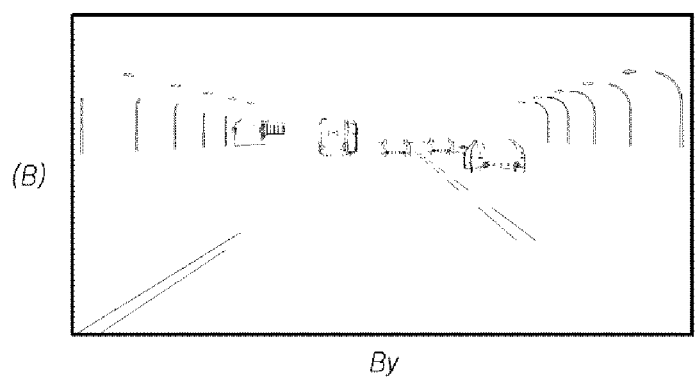
(B)
By

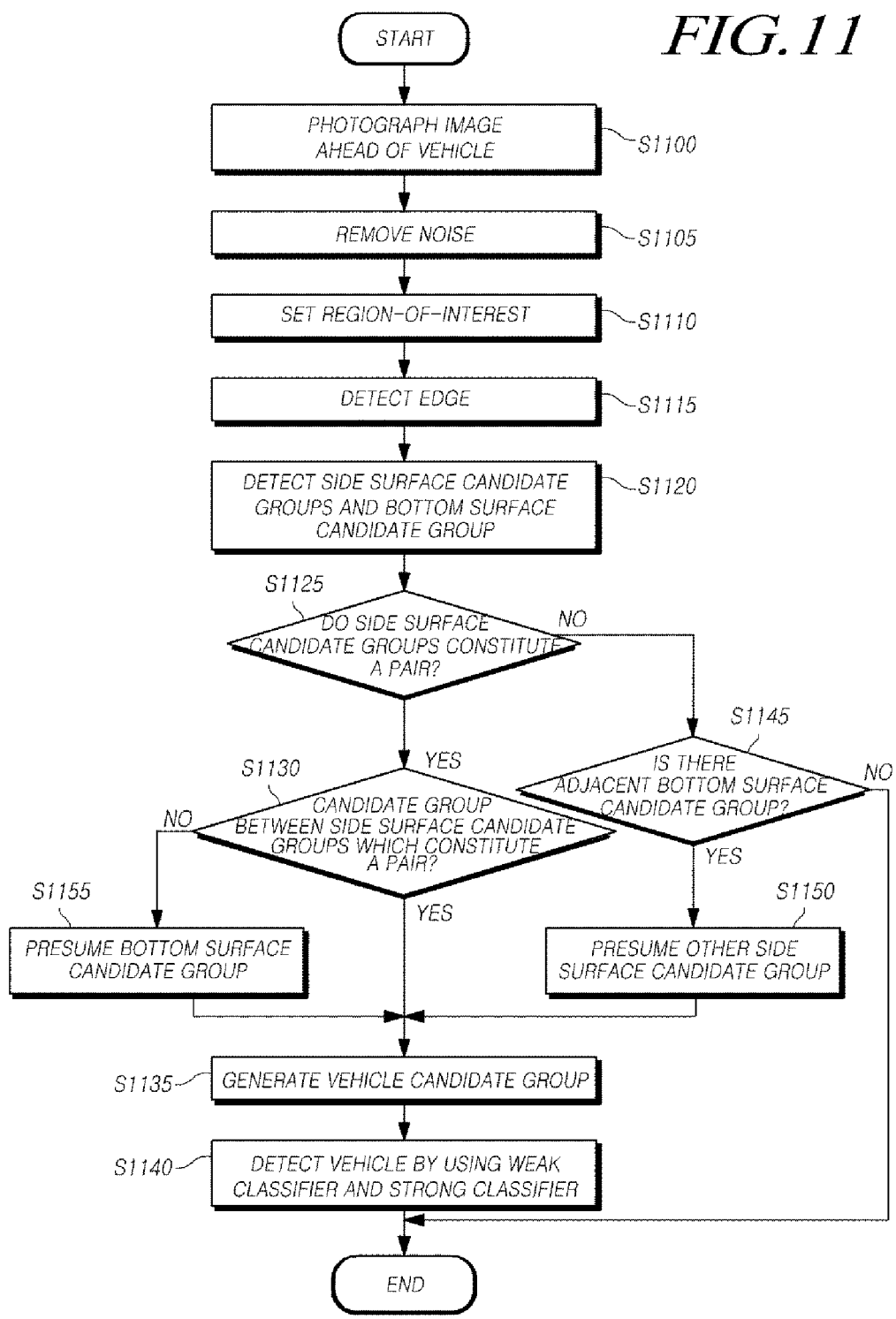

SYSTEM AND METHOD FOR DETECTING VEHICLE

CROSS-REFERENCE TO RELATED APPLICATION

This application claims priority from and the benefit under 35 U.S.C. § 119(a) of Korean Patent Application No. 10-2015-0013314, filed on 28 Jan. 2015, which is hereby incorporated by reference for all purposes as if fully set forth herein.

BACKGROUND OF THE INVENTION

1. Field of the Invention

The present invention relates to a system and method for detecting a vehicle and, more specifically, to a system and method for detecting a vehicle, which can generate a vehicle candidate group presumed as a vehicle even when one of a side surface or bottom surface of the vehicle is not detected, thereby more precisely detecting a preceding vehicle so as to secure a driver's safety.

2. Description of the Prior Art

Recently, systems, which can implement various functions by recognizing vehicles in front of or behind a driver's vehicle, have been installed in vehicles one after another. The above-described systems may display images of preceding and following vehicles, as they are, to a driver or may process the images to provide particular information to the driver.

A forward collision warning system among these systems may detect the preceding vehicle by using a radar for detecting a vehicle and a camera for outputting an image of the vehicle, thereby giving a warning to the driver or automatically applying the brake according to the possibility of a collision so as to prevent a collision between the driver's vehicle and the preceding vehicle.

Recently, thanks to the simplification of a system structure and the reduction of production cost, a vehicle recognition method, which can recognize a vehicle by using an image photographed by a camera without using peripheral devices such as radar, has been increasingly required.

As described above, when a preceding vehicle is detected by using an image photographed by a camera, the result of vehicle recognition may vary according to illumination and weather. For example, when sunlight is intense side light or backlight, a side surface or bottom surface of a preceding vehicle is unclear and thus the preceding vehicle may not be detected. Therefore, the forward collision warning system does not give a warning to a driver or does not automatically apply the brake, and thus may threaten the safety of the driver.

SUMMARY OF THE INVENTION

The present invention provides a system and method for detecting a vehicle, which may generate a vehicle candidate group presumed as a vehicle even when one of a side surface or bottom surface of the vehicle is not detected, thereby more precisely detecting a preceding vehicle so as to secure a driver's safety.

The above-described purpose may be achieved by a vehicle detection system including: a camera that photographs a front view of a vehicle; an edge detection unit that detects an edge from an image photographed by the camera and generates a horizontal binary image and a vertical binary image; a first candidate group detection unit that detects a bottom surface candidate group relating to a preceding vehicle from the horizontal binary image and detects a side surface candidate group relating to the preceding vehicle from the vertical binary image; a second candidate group detection unit, when one of a pair of side surface candidate groups and bottom surface candidate groups of the pair of side surface candidate groups is not detected, configured to presume the side surface candidate group and bottom surface candidate group and generate a vehicle candidate group; and a vehicle detection unit that filters the vehicle candidate group and detects the preceding vehicle.

The above-described purpose may also be achieved by a vehicle detection method including: photographing a front-view of a vehicle; detecting an edge from an image photographed by the camera and generating a horizontal binary image and a vertical binary image; detecting a bottom surface candidate group relating to a preceding vehicle from the horizontal binary image and detecting a side surface candidate group relating to the preceding vehicle from the vertical binary image; when one of a pair of side surface candidate groups and bottom surface candidate groups of the pair of side surface candidate groups is not detected, presuming the side surface candidate group and bottom surface candidate group and generating a vehicle candidate group; and filtering the vehicle candidate group and detecting the preceding vehicle.

In a vehicle detection system according to the present invention, even when all of vehicles are not perfectly photographed, a vehicle candidate group of a preceding vehicle can be generated, and the preceding vehicle can thus be more precisely detected. Therefore, the present invention can, as needed, give a warning to a driver or automatically apply the brake, and thus secure the safety of a driver.

BRIEF DESCRIPTION OF THE DRAWINGS

The above and other objects, features and advantages of the present invention will be more apparent from the following detailed description taken in conjunction with the accompanying drawings, in which:

FIG. 3 is an exemplary view of an image, in which a region-of-interest is set, in the vehicle detection system in FIG. 1;

FIG. 5 is an exemplary view of a horizontal binary image and a vertical binary image, which are generated by horizontal binarization and vertical binarization, in the vehicle detection system in FIG. 1;

FIG. 11 is a flowchart illustrating detecting a vehicle in a vehicle detection system according to the present invention.

DETAILED DESCRIPTION OF THE EXEMPLARY EMBODIMENTS

Figure 1:
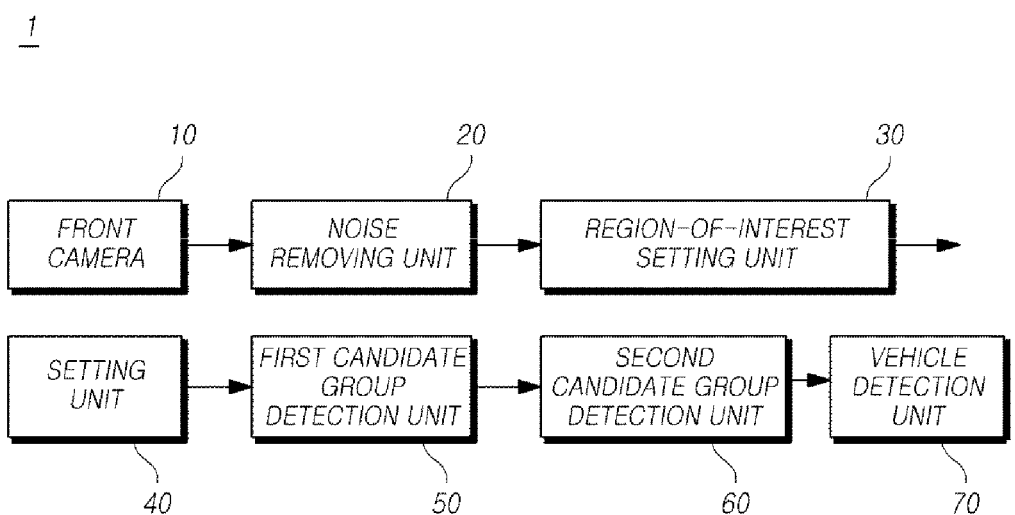
FIG. 1 is a configuration block diagram of a vehicle detection system according to the present invention.

Hereinafter, some embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a configuration block diagram of a vehicle detection system according to the present invention.

When one of a pair of side surface candidate groups and a bottom surface candidate groups relating to the pair of side surface candidate groups is not detected in the case of detecting a vehicle candidate group from a front image photographed by the camera, a vehicle detection system 1 according to the present invention presumes the side surface candidate groups or the bottom surface candidate group and generates a plurality of vehicle candidate groups; and filters the plurality of vehicle candidate groups and detects vehicles.

The present vehicle detection system 1 may include: a front camera 10 that captures an image ahead of a vehicle; a noise removing unit 20 that removes a noise from a front image; a region-of-interest setting unit 30 that sets a region-of-interest in the front image; an edge detection unit 40 that detects an edge from the front image and binarizing the detected edge; a first candidate group detection unit 50 that detects a bottom surface candidate group and a side surface candidate group from a binarized image; a second candidate group detection unit 60 that detects a vehicle candidate group; and a vehicle detection unit 70 that detects a vehicle from the vehicle candidate group.

Figure 2:
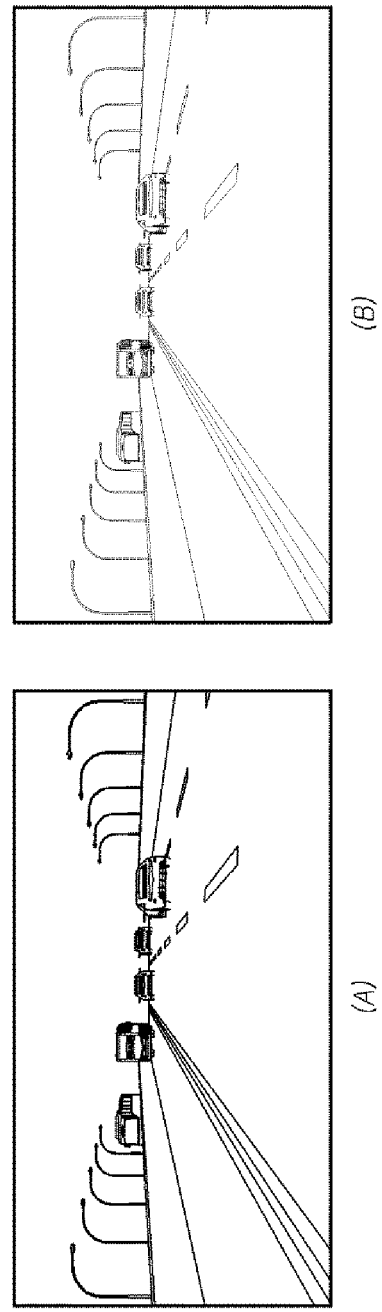
FIG. 2 is an exemplary view of a photographed image and an image from which a noise is removed in the vehicle detection system in FIG. 1.

The front camera 10, which corresponds to a monocular camera, is installed at the front of a vehicle to capture an image ahead of the vehicle. A front image, which has been photographed by the front camera 10, is transferred to the noise removing unit 20. FIG. 2A illustrates a front image, which has been photographed by the front camera 10.

The noise removing unit 20 removes a noise from the front image, which has been photographed by the front camera 10, thereby making it easy to detect an edge. The noise removing unit 20 removes a noise by convoluting a 3×3 mean filter on the front image, and therefore the image as illustrated in FIG. 2B may be output. In the present embodiment, the mean filter has been used in order to remove a noise. However, other filters may be used.

The region-of-interest setting unit 30 may project the maximum vehicle-detectable distance on a front image, from which a noise has been removed, by using a nomography matrix (H-matrix) in a three-dimensional real coordinate system. Here, the H-matrix indicates a function for mapping the three-dimensional real coordinate system to a two-dimensional front image coordinate system.

The region-of-interest setting unit 30 may, as illustrated in FIG. 3A, project the three-dimensional coordinate system, which illustrates the maximum vehicle-detectable distance as a red point, on the front image by using the H-matrix, thereby setting a region within the maximum vehicle-detectable distance as a region-of-interest, as illustrated in FIG. 3B. Here, the region-of-interest becomes a region below a red line in FIG. 3B.

Figure 4:
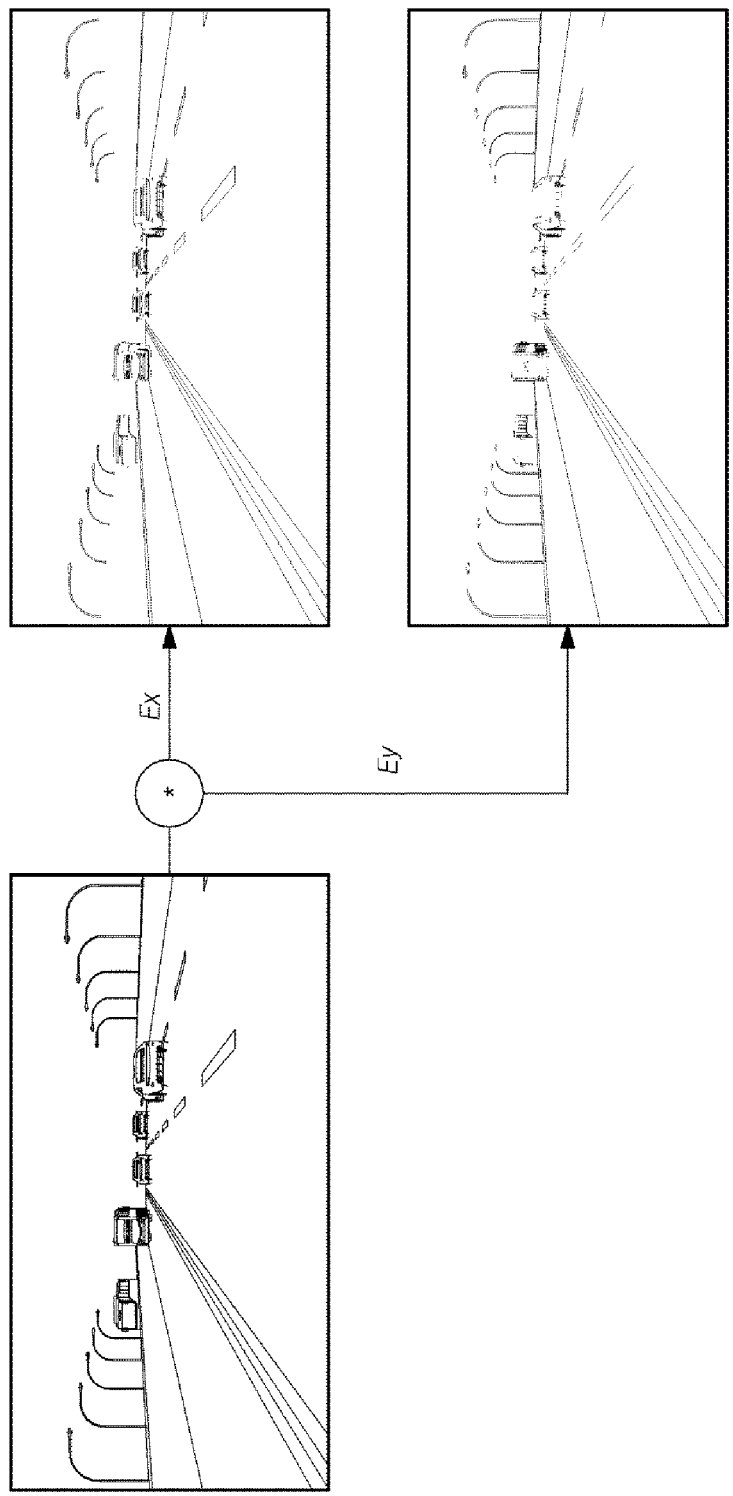
FIG. 4 is an exemplary view of an image processed for detecting an edge in the vehicle detection system in FIG. 1.

The edge detection unit 40 performs a differential calculation in order to detect an edge, and, in the present embodiment, may calculate a horizontal slope and vertical slope of the front image by using a Sobel differential operator. FIG. 4 illustrates a horizontal slope image and vertical slope image of a front image, obtained by using the Sobel differential operator.

Then, the edge detection unit 40 binarizes the horizontal slope image and vertical slope image by 0 and 1. In other words, the edge detection unit 40 assigns "1" to a point, which has a slope value equal to or larger than a preset threshold value, of a horizontal slope image and vertical slope image, and assigns "0" to a point having a slope value equal to or smaller than a preset threshold value, thereby binarizing the horizontal slope image and vertical slope image and generating the horizontal binary image and vertical binary image as illustrated in FIGS. 5A and 5B.

The first candidate group detection unit 50 may detect a bottom surface candidate group and a side surface candidate group from the horizontal binary image and the vertical binary image, respectively.

Figure 6:
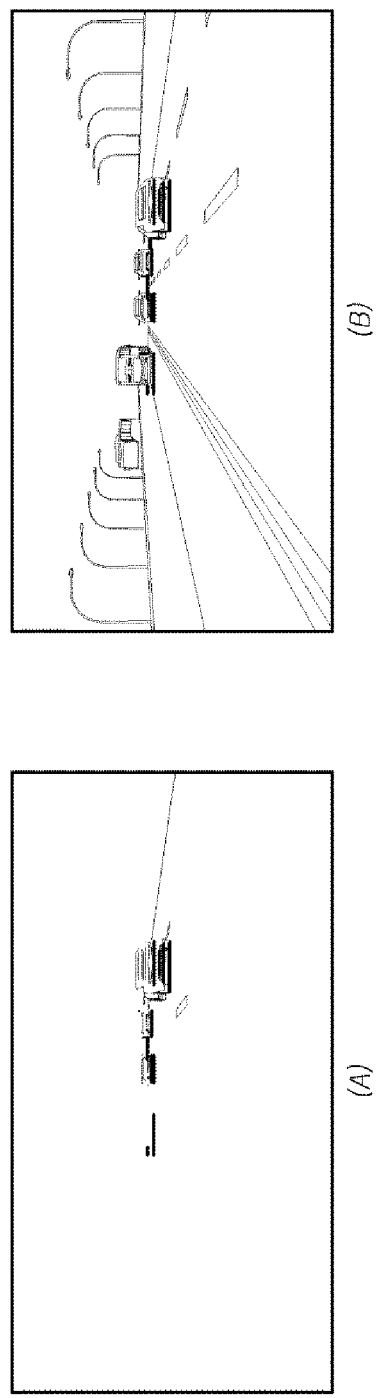
FIG. 6 is an exemplary view of an image, which is generated by horizontal binarization, and an image having a vehicle bottom surface candidate group detected from a front image, in the vehicle detection system of FIG. 1.

The first candidate group detection unit 50 may label the horizontal binary image by using a connected component method in order to detect the bottom surface candidate group from the horizontal binary image. The first candidate group detection unit 50 detects a bottom surface from the horizontal binary image by using the connected component method, converts the labeled horizontal binary image to a three-dimensional image by using an inverse perspective matrix (IPM), and then determines whether the detected bottom surface satisfies the real width of a vehicle. In other words, since, in the three-dimensional image, the range of the size of a preceding vehicle is determined according to a distance between a driver's vehicle and the preceding vehicle, whether the detected bottom surface, which is detected according to a distance from the driver's vehicle, accords with the width of the preceding vehicle is determined. Therefore, as illustrated in FIG. 6A, the bottom surface candidate group is indicated on the horizontal binary image, and if the detected bottom surface candidate group is applied to the front image, it is indicated as illustrated in FIG. 6B.

Figure 7:
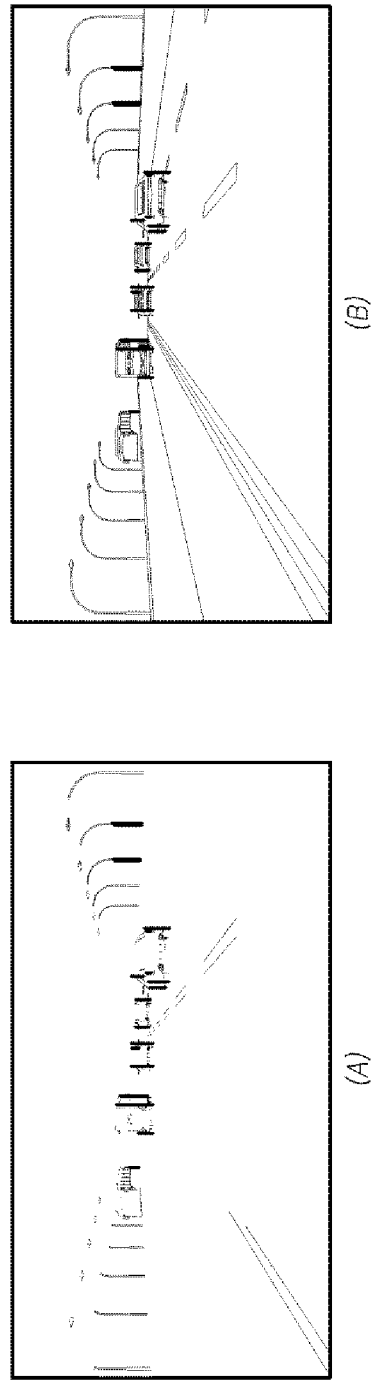
FIG. 7 is an exemplary view of an image, which is generated by vertical binarization, and an image having a vehicle side surface candidate group detected from a front image, in the vehicle detection system of FIG. 1.

The first candidate group detection unit 50 may label a vertical binary image by using a connected component method in order to detect the side surface candidate group from the vertical binary image. The first candidate group detection unit 50 detects a side surface from the vertical binary image by using the connected component method, converts the labeled vertical binary image to a three-dimensional image by using an inverse perspective matrix (IPM), and then determines whether the detected side surface satisfies the real height of a vehicle. In other words, since, in the three-dimensional image, the range of the size of a preceding vehicle is determined according to a distance between a driver's vehicle and the preceding vehicle, whether the side surface, which is detected according to a distance from the driver's vehicle, accords with the height of the preceding vehicle is determined. Therefore, as illustrated in FIG. 7A, the side surface candidate group is indicated on the vertical binary image, and if the detected side surface candidate group is applied to the front image, it is indicated as illustrated in FIG. 7B.

The second candidate detection unit 60 may detect a window-shaped vehicle candidate group by using the side surface candidate group and bottom surface candidate group which are detected by the first candidate group detection unit 50. The second candidate group detection unit 60 extracts, first, side surface candidate groups, which constitute a pair, from side surface candidate groups detected by the first candidate group detection unit 50. Here, the side surface candidate groups, which constitute a pair, refer to a pair of side surface candidate groups which constitute both side surfaces of a vehicle, on the basis of a size comparison with the vehicle.

When a pair of side surface candidate groups is extracted, the second candidate group detection unit 60 determines whether there is a bottom surface candidate group between the pair of side surface candidate groups. If there is the bottom surface candidate group between the pair of side surface candidate groups, the second candidate group detection unit 60 may generate a window-shaped vehicle candidate group by using the pair of side surface candidate groups and the bottom surface candidate group.

When a pair of side surface candidate groups is extracted but there is no bottom surface candidate group between the pair of side surface candidate groups, the second candidate group detection unit 60 may determine the upper and lower ends of the pair of side surface candidate groups and presume the position of a bottom surface. In other words, the second candidate group detection unit 60 may generate a bottom surface candidate group connecting the lower ends of a pair of side surface candidate groups, thereby generating a window-shaped vehicle candidate group.

When a bottom surface candidate group, which is adjacent to one of a pair of side surface candidate groups, is extracted, the second candidate group detection unit 60 may connect the side surface candidate groups and the bottom surface candidate group, and presume the other side surface candidate group facing the detected side surface candidate group, thereby generating a window-shaped vehicle candidate group. Here, the second candidate group detection unit 60 may presume and generate the other side surface candidate group in a location spaced apart from the detected side surface candidate group by the width of a vehicle.

Figure 8:
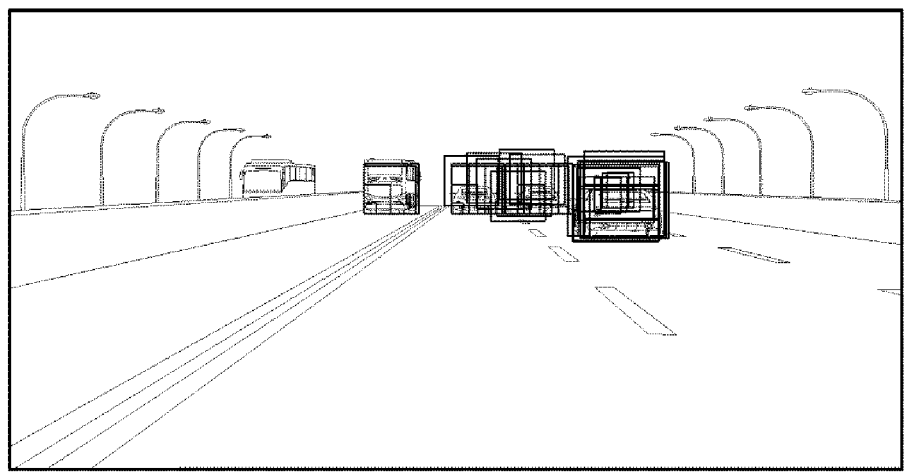
FIG. 8 is an exemplary view of an image from which a vehicle candidate group is detected in the vehicle detection system in FIG. 1.

If the second candidate group detection unit 60 generates a vehicle candidate group through the above-described step, a plurality of vehicle candidate groups is indicated on a front image as illustrated in FIG. 8.

The vehicle detection unit 70 filters vehicle candidate groups, which are detected by the second candidate group detection unit 60, by using a weak classifier and a strong classifier, and thereby may detect a preceding vehicle from a plurality of vehicle candidate groups.

The weak classifier may distinguish between a vehicle and a non-vehicle by using a pre-learned feature point vector of a vehicle. A feature point vector, which enables the distinction between a vehicle and a non-vehicle, is generated by learning, in advance, horizontal edge power (the number of edges per unit area), vertical edge power, and the degree of symmetry among features which distinguish the vehicle and the non-vehicle. The pre-learning prepares three feature point vectors in which images of real vehicles and images of non-vehicles are collected and generalized to have the same size, and then are grouped by using horizontal edge power and vertical edge power from the generalized images, are grouped by using the horizontal edge power and degree of symmetry, and are grouped by using the vertical edge power and degree of symmetry. Further, the vehicle detection unit 70 may distinguish between a vehicle and a non-vehicle by using the feature point vectors.

The vehicle detection unit 70 generalizes the size of a vehicle candidate group to be the same as that of a vehicle used for learning in the weak classifier, and then detects horizontal edge power and vertical edge power of the vehicle candidate group and calculates the degree of symmetry thereof. Then, the vehicle detection unit 70 may compare, with the feature point vectors, each of the horizontal edge power and vertical edge power of the vehicle candidate group, the horizontal edge power and degree of symmetry thereof, and the vertical edge power and degree of symmetry thereof, thereby determining whether the vehicle candidate group belongs to vehicle groups.

Figure 9:
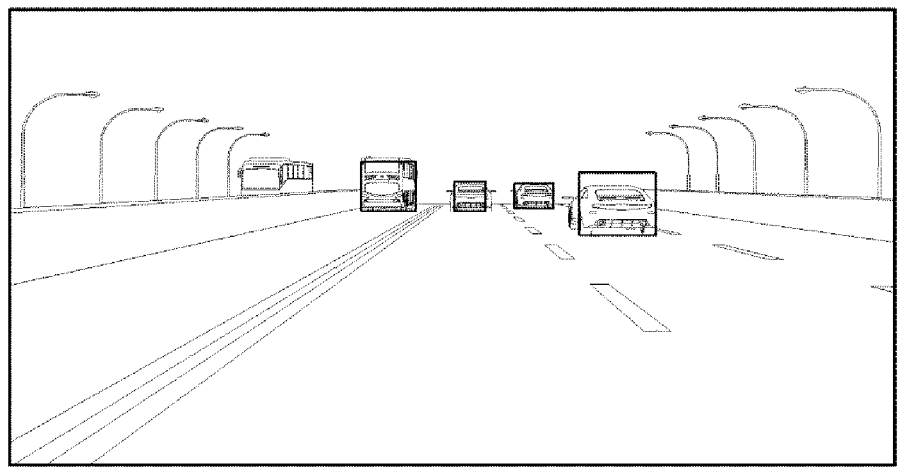
FIG. 9 is an exemplary view of an image in which a vehicle is detected in the vehicle detection system in FIG. 1.

The strong classifier filters, again, the vehicle candidate group, which has passed through the weak classifier, by using a support vector machine (SVM) corresponding to one of classification algorithms. If the vehicle candidate group passes through the strong classifier, a front image, in which a preceding vehicle has been detected, is displayed as illustrated in FIG. 9.

Meanwhile, the vehicle detection unit 70 may detect a preceding vehicle from a plurality of vehicle candidate groups by using machine learning, for example, an adaptive boosting method.

Figure 10:
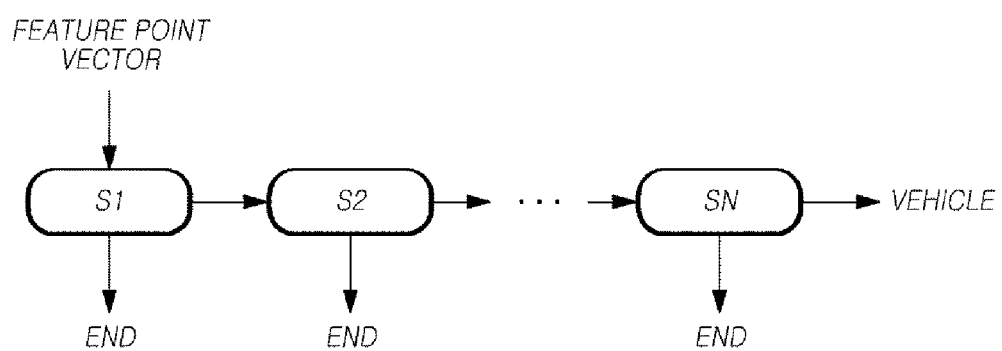
FIG. 10 is an exemplary view of a preceding vehicle detection method using an adaptive boosting method.

FIG. 10 is an exemplary view of a preceding vehicle detection method using an adaptive boosting method.

Through offline learning, a filtering model including a plurality of steps (S1, S2, . . . , SN) may be generated.

The vehicle detection unit 70 may input a feature point vector to such a filtering model and detect a preceding vehicle from a vehicle candidate group.

For example, the vehicle detection unit 70 may input a feature point vector to a first step (S1) and determine whether a calculated value of the first step (S1) exceeds a threshold value. Further, when the calculated value of the first step (S1) is larger than the threshold value, the vehicle detection unit 70 may perform a calculation of a second step (S2). In addition, the vehicle detection unit 70 may sequentially perform a calculation of each step and finally detect a preceding vehicle from a vehicle candidate group.

A filtering model according to the adaptive boosting method includes, as described above, a plurality of cascade type steps. The vehicle detection unit 70 may detect a preceding vehicle from a vehicle candidate group by using a cascade type filtering model.

The vehicle detection unit 70 may increase the reliability of preceding vehicle detection by verifying the vehicle candidate group through a plurality of steps.

Meanwhile, if the calculated value of each step is smaller than the threshold value, the vehicle detection unit 70 may terminate preceding vehicle detection in the corresponding step. For example, if a calculated value of the first step (S1) is smaller than a threshold value, the vehicle detection unit 70 may terminate preceding vehicle detection. As described above, the vehicle detection unit 70 may filter objects other than a preceding vehicle without going through all of a plurality of steps (S1, S2, . . . , SN). Therefore, the filtering calculation speed may increase.

Detecting a vehicle in a vehicle detection system 1 of the present invention according to such a configuration will be described below with reference to FIG. 11.

If the front camera 10 captures an image ahead of a vehicle (S1100), the photographed front image is transferred to the noise removing unit 20 to remove a noise from the photographed front image so that an edge is easily detected (S1105). The front image from which a noise is removed is transferred to the region-of-interest setting unit 30, and the region-of-interest setting unit 30 sets a region-of-interest while reflecting the maximum vehicle-recognizable distance in three-dimensional space (S1110).

The edge detection unit 40 detects an edge from a front image in which the region-of-interest is set and generates a horizontal slope image and a vertical slope image; and binarizes the horizontal slope image and the vertical slope image and generates a horizontal binary image and a vertical binary image (S1115).

The first candidate group detection unit 50 detects a vehicle bottom surface candidate group from the horizontal binary image, and detects a vehicle side surface candidate group from the vertical binary image (S1120). Then, the second candidate group detection unit 60 detects a vehicle candidate group by using the bottom surface candidate group and the side surface candidate group.

The second candidate group detection unit 60 is provided with information on the detected bottom surface candidate group and side surface candidate groups, which have been detected by the first candidate group detection unit 50, and determines, first, whether each side surface candidate group constitutes a pair (S1125). When the side surface candidate groups constitute a pair, the second candidate group detection unit 60 determines whether there is the bottom surface candidate group between the side surface candidate groups which constitute a pair (S1130). If there is a bottom surface candidate group, the second candidate group detection unit 60 generates a window-shaped vehicle candidate group including a pair of side surface candidate groups and the bottom surface candidate group (S1135).

Meanwhile, when the side surface candidate groups do not constitute a pair (S1125-N), the second candidate group detection unit 60 determines whether there is a bottom surface candidate group adjacent to the side surface candidate groups (S1145). When there is a bottom surface candidate group, the second candidate group detection unit 60 presumes the other side surface candidate group facing one side surface candidate group on the basis of the bottom surface candidate group (S1150), and generates a window-shaped vehicle candidate group by using the side surface candidate group, the bottom surface candidate group, and the other side surface candidate group (S1135). If the side surface candidate groups do not constitute a pair and there is no bottom surface candidate group, the second candidate group detection unit 60 determines the corresponding side surface candidate group not to be a vehicle and ignores the corresponding side surface candidate group.

When side surface candidate groups constitute a pair but there is no bottom surface candidate group between the pair of side surface candidate groups (S1130-N), the second candidate group detection unit 60 presumes and generates a bottom surface candidate group on the basis of the upper and lower ends of the pair of side surface candidate. Then, the second candidate group detection unit 60 generates a window-shaped vehicle candidate group by using a pair of side surface candidate groups and the presumed bottom surface candidate group (S1135).

As described above, when a vehicle candidate group is generated by the second candidate group detection unit 60, the vehicle detection unit 70 may compare a feature point vector learned in advance and a feature point vector of the vehicle candidate group, and then firstly filter the vehicle candidate group by using the weak classifier and secondly filter the vehicle candidate group by using a SVM which corresponds to a strong classifier, thereby detecting a vehicle (S1140).

As described above, in the case of generating a vehicle candidate group by using vehicle side surface candidate groups and a vehicle bottom surface candidate group, when there is no one of a pair of side surface candidate groups and a bottom surface candidate group, the vehicle detection system 1 according to the present invention generates the vehicle candidate group through presuming an undetected side surface candidate group or an undetected bottom surface candidate group by using a detected side surface candidate group or a detected bottom surface candidate group. Therefore, even when all of vehicles are not perfectly photographed, the vehicle detection system 1 may generate a vehicle candidate group of a preceding vehicle, and thus more precisely detect the preceding vehicle. Therefore, the system may, as needed, give a warning to a driver or automatically apply the brake, and thus secure the safety of a driver.

A standard content or standard documents set forth in the above-described embodiment, which have been omitted for a brief description, constitute a part of the present specification. Therefore, adding some of the above standard content and some contents of the above standard documents to the present specification or setting forth them in claims should be interpreted to correspond to the range of the present invention.

Although the embodiments of the present invention have been described for illustrative purposes, those skilled in the art will appreciate that various modifications, additions and substitutions are possible, without departing from the scope and spirit of the invention. Therefore, exemplary aspects of the present invention have not been described for limiting purposes. The scope of the present invention shall be construed on the basis of the accompanying claims in such a manner that all of the technical ideas included within the scope equivalent to the claims belong to the present invention.

What is claimed is:
1. A vehicle detection method comprising:
photographing a front-view of a vehicle;
detecting an edge from an image photographed by a camera and generating a horizontal binary image and a vertical binary image;
detecting a bottom surface candidate group relating to a preceding vehicle from the horizontal binary image and detecting a side surface candidate group relating to the preceding vehicle from the vertical binary image;
when one of a pair of side surface candidate groups and bottom surface candidate groups of the pair of side surface candidate groups is not detected, estimating the side surface candidate group and bottom surface candidate group and generating a vehicle candidate group; and
filtering the vehicle candidate group and detecting the preceding vehicle.

2. The method of claim 1, wherein when the pair of side surface candidate groups only is detected, the generating of a vehicle candidate group is to generate the vehicle candidate group by estimating a bottom surface candidate group by the lower end of the pair of side surface candidate group.

3. The method of claim 1, wherein when one side surface candidate group only is detected and there is a bottom surface candidate group adjacent to the one side surface candidate group, the generating of the vehicle candidate group is to generate the vehicle candidate group by estimating the other side surface candidate group facing the one side surface candidate group so as to be adjacent to the bottom surface candidate group.

4. The method of claim 3, wherein the generating of the vehicle candidate group comprises generating the other side surface candidate group at the position spaced apart from the one side surface candidate group by the width of a vehicle.

5. The method of claim 1, wherein when there are the pair of side surface candidate groups and a bottom surface candidate group between the pair of side surface candidate groups, the generating of a vehicle candidate group is to generate a vehicle candidate group by connecting the pair of side surface candidate groups and the bottom surface candidate group.

6. The method of claim 1, further comprising setting a region-of-interest on the basis of the maximum distance at which a preceding vehicle can be detected from an image photographed by the camera,
  wherein, in generating the horizontal binary image and the vertical binary image, an edge is detected from a region-of-interest among images photographed by the camera and the horizontal binary image and the vertical binary image are generated.

7. The method of claim 1, wherein, in detecting the preceding vehicle, the preceding vehicle is detected from the vehicle candidate group by using a cascade-type filtering model generated by an adaptive boosting method.

* * * * *